US007978875B2

(12) United States Patent
Sharma et al.

(10) Patent No.: US 7,978,875 B2
(45) Date of Patent: *Jul. 12, 2011

(54) SIGNAL PROCESSING UTILIZING HOST CARRIER INFORMATION

(75) Inventors: Ravi K. Sharma, Portland, OR (US); Ammon E. Gustafson, Tigard, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/539,093

(22) Filed: Aug. 11, 2009

(65) Prior Publication Data

US 2009/0296983 A1    Dec. 3, 2009

Related U.S. Application Data

(63) Continuation of application No. 11/349,743, filed on Feb. 7, 2006, now Pat. No. 7,574,014, which is a continuation of application No. 09/945,244, filed on Aug. 31, 2001, now Pat. No. 7,013,021, which is a continuation-in-part of application No. 09/302,663, filed on Apr. 30, 1999, now Pat. No. 6,442,284.

(60) Provisional application No. 60/125,349, filed on Mar. 19, 1999.

(51) Int. Cl.
*G06K 9/00* (2006.01)
*H04L 9/32* (2006.01)
(52) U.S. Cl. .................................... 382/100; 713/176
(58) Field of Classification Search ............ 382/100.232, 382/240; 713/176, 179; 380/51, 54, 210, 380/252, 287; 370/522–529; 283/72, 74–81, 283/85, 93, 113, 901, 902; 358/3.28
See application file for complete search history.

(56) References Cited

U.S. PATENT DOCUMENTS

| 5,568,570 | A | 10/1996 | Rabbani |
| 5,678,155 | A | 10/1997 | Miyaza |
| 5,742,704 | A | 4/1998 | Suzuki et al. |
| 5,809,139 | A | 9/1998 | Girod et al. |
| 5,828,467 | A | 10/1998 | Suzuki |

(Continued)

FOREIGN PATENT DOCUMENTS

EP            0 789 270         8/1997

(Continued)

OTHER PUBLICATIONS

Alattar, Smart Images Using Digimarc's Watermarking Technology, SPIE's 12.sup Symposium on Electronic Imaging, Jan. 25, 2000, vol. 3971, No. 25, 10 pages.

(Continued)

*Primary Examiner* — Abolfazl Tabatabai

(57) ABSTRACT

The present invention generally relates to processing audio, video and images. One claim recites a method including: obtaining media signal comprising a steganographic signal hidden therein; utilizing a programmed electronic processor, selecting portions of the media signal for steganographic signal detection, wherein the subset of the media signal is selected based on at least one or more predetermined probability factors, in which a probability factor comprises a selection criteria or rule to identify portions of the media signal which have a higher likelihood of including a steganographic signal relative to other portions of the media signal; and utilizing a programmed electronic processor, analyzing selected portions of the media signal to obtain the steganographic signal. Of course, other claims and combinations are provided as well.

20 Claims, 12 Drawing Sheets

U.S. PATENT DOCUMENTS

| | | | |
|---|---|---|---|
| 5,859,920 | A | 1/1999 | Daly et al. |
| 5,862,260 | A | 1/1999 | Rhoads |
| 5,889,868 | A | 3/1999 | Moskowitz et al. |
| 5,915,027 | A | 6/1999 | Cox et al. |
| 5,930,369 | A * | 7/1999 | Cox et al. .................. 380/54 |
| 5,949,885 | A | 9/1999 | Leighton |
| 5,960,081 | A * | 9/1999 | Vynne et al. ............... 713/176 |
| 6,031,914 | A | 2/2000 | Tewfik et al. |
| 6,044,182 | A | 3/2000 | Daly et al. |
| 6,061,793 | A | 5/2000 | Tewfik et al. |
| 6,108,434 | A | 8/2000 | Cox et al. |
| 6,122,403 | A | 9/2000 | Rhoads |
| 6,154,571 | A | 11/2000 | Cox et al. |
| 6,175,627 | B1 | 1/2001 | Petrovic et al. |
| 6,181,802 | B1 | 1/2001 | Todd |
| 6,185,312 | B1 | 2/2001 | Nakamura et al. |
| 6,208,735 | B1 | 3/2001 | Cox et al. |
| 6,209,094 | B1 * | 3/2001 | Levine et al. ............... 713/176 |
| 6,222,932 | B1 * | 4/2001 | Rao et al. ................... 382/100 |
| 6,311,214 | B1 | 10/2001 | Rhoads |
| 6,314,192 | B1 * | 11/2001 | Chen et al. ................. 382/100 |
| 6,324,573 | B1 | 11/2001 | Rhoads |
| 6,330,673 | B1 * | 12/2001 | Levine ........................ 713/176 |
| 6,345,104 | B1 | 2/2002 | Rhoads |
| 6,360,000 | B1 * | 3/2002 | Collier ........................ 382/100 |
| 6,442,284 | B1 | 8/2002 | Gustafson et al. |
| 6,449,377 | B1 | 9/2002 | Rhoads |
| 6,553,127 | B1 * | 4/2003 | Kurowski .................... 382/100 |
| 6,590,996 | B1 | 7/2003 | Reed et al. |
| 6,614,914 | B1 | 9/2003 | Rhoads et al. |
| 2001/0017709 | A1 | 8/2001 | Murakami et al. |
| 2001/0028727 | A1 | 10/2001 | Naito et al. |
| 2001/0053237 | A1 | 12/2001 | Hashimoto |
| 2002/0090110 | A1 | 7/2002 | Braudaway et al. |
| 2002/0124174 | A1 | 9/2002 | Ehrmann-Patin et al. |
| 2002/0136427 | A1 | 9/2002 | Staring et al. |
| 2003/0016841 | A1 | 1/2003 | Reed et al. |

FOREIGN PATENT DOCUMENTS

| | | |
|---|---|---|
| WO | WO-01/06755 | 1/2001 |

OTHER PUBLICATIONS

Avcibas, et al., "Steganalysis of Watermarking Techniques Using Image Quality Metrics", Proceedings of SPIE, Jan. 2001, vol. 4314, pp. 523-531.

Dautzenberg, "Watermarking Images," Department of Microelectronics and Electrical Engineering, Trinity College Dublin, 47 pages, Oct. 1994.

Hernandez et al., "Statistical Analysis of Watermarking Schemes for Copyright Protection of Images," Proceedings of the IEEE, vol. 87, No. 7, Jul. 1999.

U.S. Appl. No. 60/125,349, filed Mar. 19, 1999, Alattar et al.

Non-Final Office Action on U.S. Appl. No. 09/302,663, mailed Feb. 13, 2002.

Non-final Office Action on U.S. Appl. No. 09/945,244, mailed Dec. 1, 2004.

Non-Final Office Action on U.S. Appl. No. 11/349,743 mailed Dec. 22, 2008.

Non-Final Office on U.S. Appl. No. 11/349,743, mailed Jul. 15, 2008.

Notice of Allowance on U.S. Appl. No. 09/302,663, mailed Mar. 11, 2002.

Notice of Allowance on U.S. Appl. No. 09/945,244, mailed Jun. 16, 2005.

Notice of Allowance on U.S. Appl. No. 11/349,743, mailed Apr. 6, 2009.

Response to Non-Final Office Action mailed Feb. 21, 2002 on U.S. Appl. No. 09/302,663.

Response to Non-Final Office Action mailed Apr. 4, 2005, on U.S. Appl. No. 09/945,244.

* cited by examiner

Fig. 9a

| 0 | 0 | 1 |
|---|---|---|
| 0 | 1 | 0 |
| 1 | 0 | 0 |

Fig. 9b

| 0 | 0 | 0 |
|---|---|---|
| 1 | 1 | 0 |
| 0 | 0 | 0 |

Fig. 9c

| 0 | 0 | 1 |
|---|---|---|
| 1 | 1 | 0 |
| 1 | 0 | 0 |

36

| 1 | 2 | 3 |
|---|---|---|
| 4 | 5 | 6 |
| 7 | 8 | 9 |

SIGNAL PROCESSING UTILIZING HOST CARRIER INFORMATION

RELATED APPLICATION DATA

This application is a continuation of U.S. patent application Ser. No. 11/349,743, filed Feb. 7, 2006 (U.S. Pat. No. 7,574,014), which is a continuation of U.S. patent application Ser. No. 09/945,244, filed Aug. 31, 2001 (U.S. Pat. No. 7,013,021). The 09/945,244 application is a continuation in part of U.S. patent application Ser. No. 09/302,663 (U.S. Pat. No. 6,442,284), filed Apr. 30, 1999, which claims the benefit of U.S. Provisional Application No. 60/125,349 filed Mar. 19, 1999.

The present invention is also related to U.S. patent application Ser. No. 09/771,340, filed Jan. 26, 2001 (U.S. Pat. No. 7,072,487), and Ser. No. 09/503,881, filed Feb. 14, 2000 (U.S. Pat. No. 6,614,914).

FIELD OF THE INVENTION

The present invention relates to steganography and, more particularly, to the detection of steganographic signals in media such as images, video and audio signals.

BACKGROUND AND SUMMARY OF THE INVENTION

The technology for embedding digital watermarks in images is well known. Likewise, the technology for detecting and reading the data payload carried by digital watermarks is well known. Assignee's U.S. patent application Ser. No. 09/503,881, filed Feb. 14, 2000, and U.S. Pat. Nos. 5,862,260 and 6,122,403 illustrate examples of various watermarking techniques. Artisans in the field know even more. Commercial systems are available for performing such operations.

Many watermarking systems redundantly embed the same watermark data in multiple regions of an image. Often watermarking systems embed data in images in a perceptually adaptive manner. That is, the amount of watermark signal in each region of an image is adjusted in accordance with the characteristics of the image in the particular region. The watermark may even be absent in some regions of the image. The purpose of so adjusting the watermark signal is to insure that the watermark signal will not be visible to an ordinary viewer of the image. Since the strength of the watermark signal varies from region to region, the signal is more easily detected in some regions of an image than in other regions of the image.

Systems for detecting watermarks generally sequentially examine the various regions of an image, seeking to detect the watermark. Generally, the amount of computational resources available is limited and if a watermark is not detected in a region as a result of applying a certain amount of computational effort, the detection operation moves on to the next region of the image and the process is repeated.

SUMMARY OF THE INVENTION

The present invention enables detection of the presence of a watermark in an efficient manner. One embodiment involves a multi-step process. First, the image is examined to determine which regions of the image have characteristics such that there is a high probability that a watermark signal can be detected in that region of the image. Next the regions that have a high probability that a watermark can be detected (in contrast to all regions of the image) are examined to find watermark data. In order to determine the probability of finding watermark data in a particular region of an image, the amount of "variance" in the intensity of the pixels in the region is examined. For example a region that is entirely white or entirely black has zero variance. Such a region cannot carry watermark data; hence regions with zero or low variance can be eliminated from further processing. Furthermore, if high variance in a region is a result of the fact that the region has an abrupt border or edge between two highly contrasting regions, the high variance does not necessarily indicate a high probability that a watermark signal will be detected in the region. Therefore, after regions with high variance are located, these regions are next examined to look for regions with edges between areas of different luminance, which are spread over the entire region. The regions with the high variance and with edginess that is spread widely in the region are selected for further processing to detect watermark data. In another embodiment, however, regions with high variance are not always indicative of a high detection probability.

For those regions selected for further processing, the detection process can be enhanced by filtering the data prior to applying a watermark detection program so as to increase the signal to noise ratio of the watermark signal. First a high pass filter (e.g. a Laplacian operator) is applied to each region. This filtering operation in effect establishes a new intensity value for each pixel in the region. Next a nonlinear operator (e.g. a signum function) is applied to the output from the first filter operation. The resulting data in each region is then processed in a normal manner to detect watermark data.

In other embodiments, additional probability factors, or region selection criteria, are used to identify image regions having a high probability of containing watermark data therein.

The foregoing and other features and advantages of the present invention will be more readily apparent from the following detailed description, which proceeds with reference to the accompanying drawings.

BRIEF DESCRIPTION OF THE DRAWINGS

FIGS. 9a-9c show another edginess detection method in relation to an image portion.

DETAILED DESCRIPTION

Digital watermarks are generally inserted into images in a redundant manner. That is, images are divided into regions and the same digital watermark data is inserted into each region of the image. The ability of a particular region of an image to effectively carry digital watermark data depends upon the characteristics of the image in the particular region. Different areas in an image may have more or less ability to carry watermark data. For example an area in an image that is entirely white or entirely black will not have the ability to carry watermark data without changing the appearance of the area. Modern watermarking programs use visually perceptual adaptive techniques when inserting watermark data into an image. The amount of watermark energy inserted into a region is adjusted depending on the characteristics of the region so as to avoid changing the visual appearance of the image. For example, no watermark energy would be applied to an area of an image that is entirely white or entirely black.

Watermark detection programs generally divide an image into regions and then sequentially try to read watermark data from each of the regions in the image. Generally several attempts are made to detect watermark data in each region of an image. This is a computationally costly endeavor.

The present invention shortens the processing time and reduces the computational power required to find a watermark in an image by first identifying those regions of the image that have a high probability that a watermark can be detected in the region. Then, regions with high probability rather than all regions are examined to locate watermark data.

It is noted that there are a number of different probability factors that can be considered in connection with watermark detection. For example, one can consider the probability that data found by a watermark detection program is in fact identical to the data that was inserted by the program that inserted the watermark. The probability discussed herein is different. The probability factors discussed herein relative to the present invention relates to the probability that a region of an image with certain characteristics can in fact be carrying watermark data.

Figure 1:
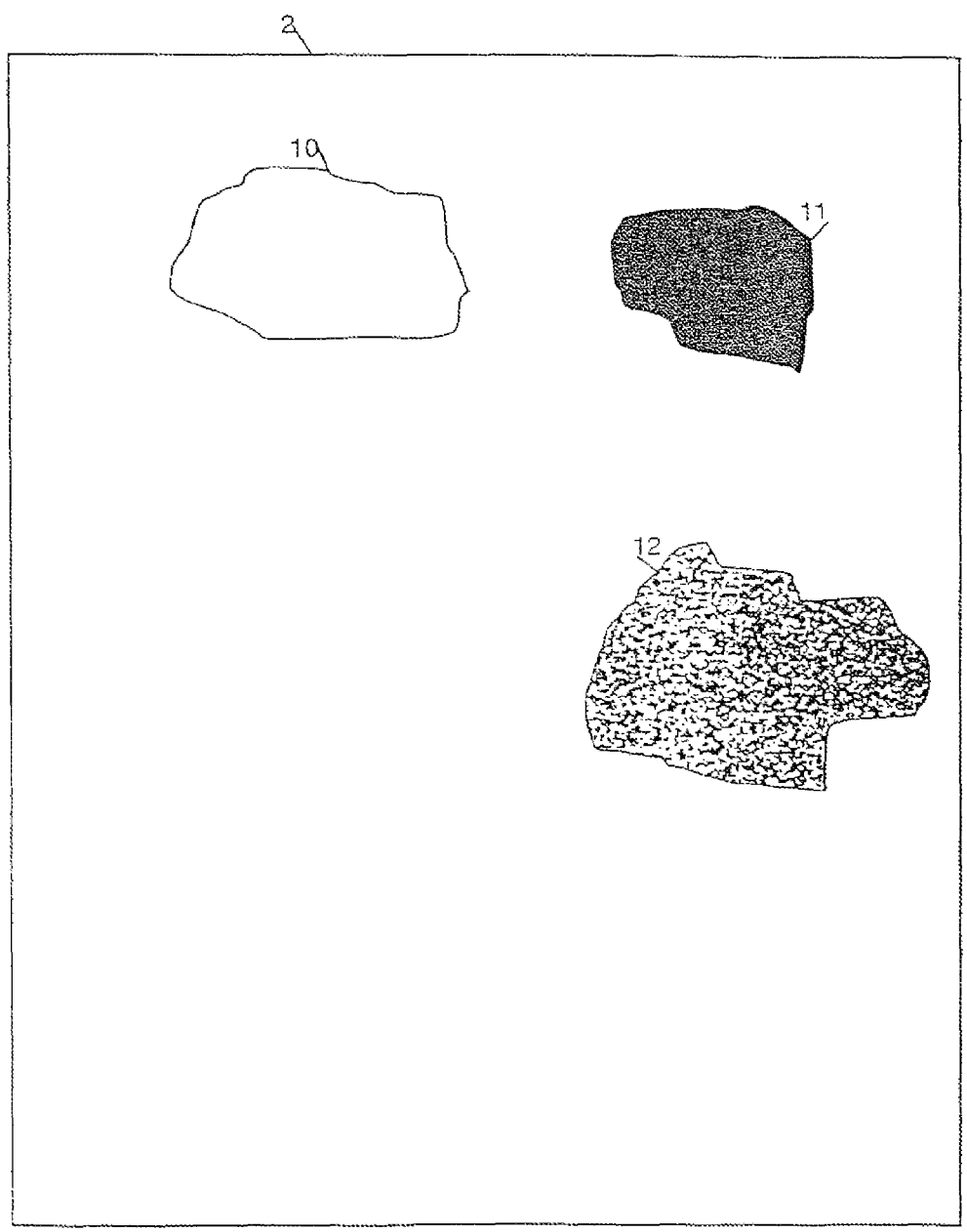
FIG. 1 shows an image with different regions.

FIG. 1 illustrates an image 2, which has a number of different identified regions. Regions with various types of specific characteristics have been shown in order to illustrate the invention. Naturally in most images the regions would not be as pronounced as those shown in FIG. 1 and there would be a variety of types of regions over the entire image 2. The present invention is applicable to any type of image. The special image shown in FIG. 1 is selected only as an example to illustrate the principles of the invention in an easily illustrated manner.

In the image 2 shown in FIG. 1, region 10 is entirely white, region 11 is entirely black and in region 12, the pixels of the image have a variety of luminance values. If a perceptually adaptive watermarking program were used to insert watermark data in an image such as image 2, no watermark data would be inserted in regions 10, 11. Thus, a program, which tried to detect watermark data in regions 10, and 11, would spend time examining these regions, but it would find no watermark data.

Figure 2:
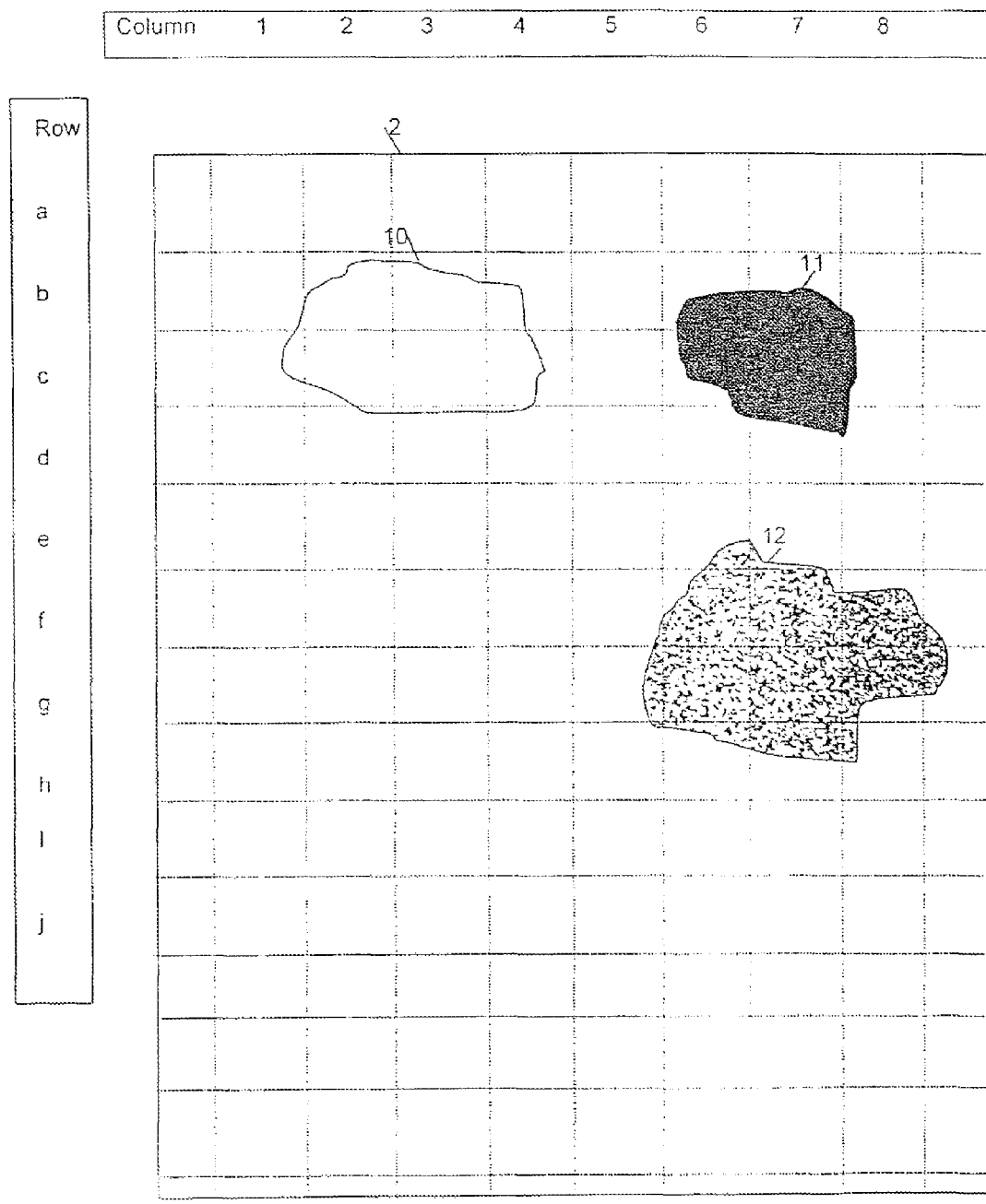
FIG. 2 shows the FIG. 1 image divided into regions for processing.

FIG. 2 shows the image 2 divided into regions. These regions can also be referred to as detection blocks. In order to detect digital watermark data, a typical watermark detection program would process the regions of an image (such as those regions shown in FIG. 2) in some sequential order. Each region would be examined to determine if watermark data could be detected. Such examination requires a significant amount of time and/or computational resources. In some applications time and/or computational resources are limited.

The present invention provides a way to pre-process or filter an image to determine the regions that are most likely to contain watermark data. The initial processing of each region, that is, the initial filtering, is done very quickly and the regions, which have the most probability of yielding watermark data, are selected for further processing to actually detect the watermark data. That is, the time consuming watermark detection algorithms are only applied to the regions, which have a higher probability of providing watermark data. For images that are scanned at a relatively high resolution (e.g., 600 ppi) the present invention optionally can use only part of the image data in order to speedup processing. For example, high-resolution data can be down-sampled (e.g., either directly or after applying antialiasing filters) to a lower resolution for analysis.

Figure 3:
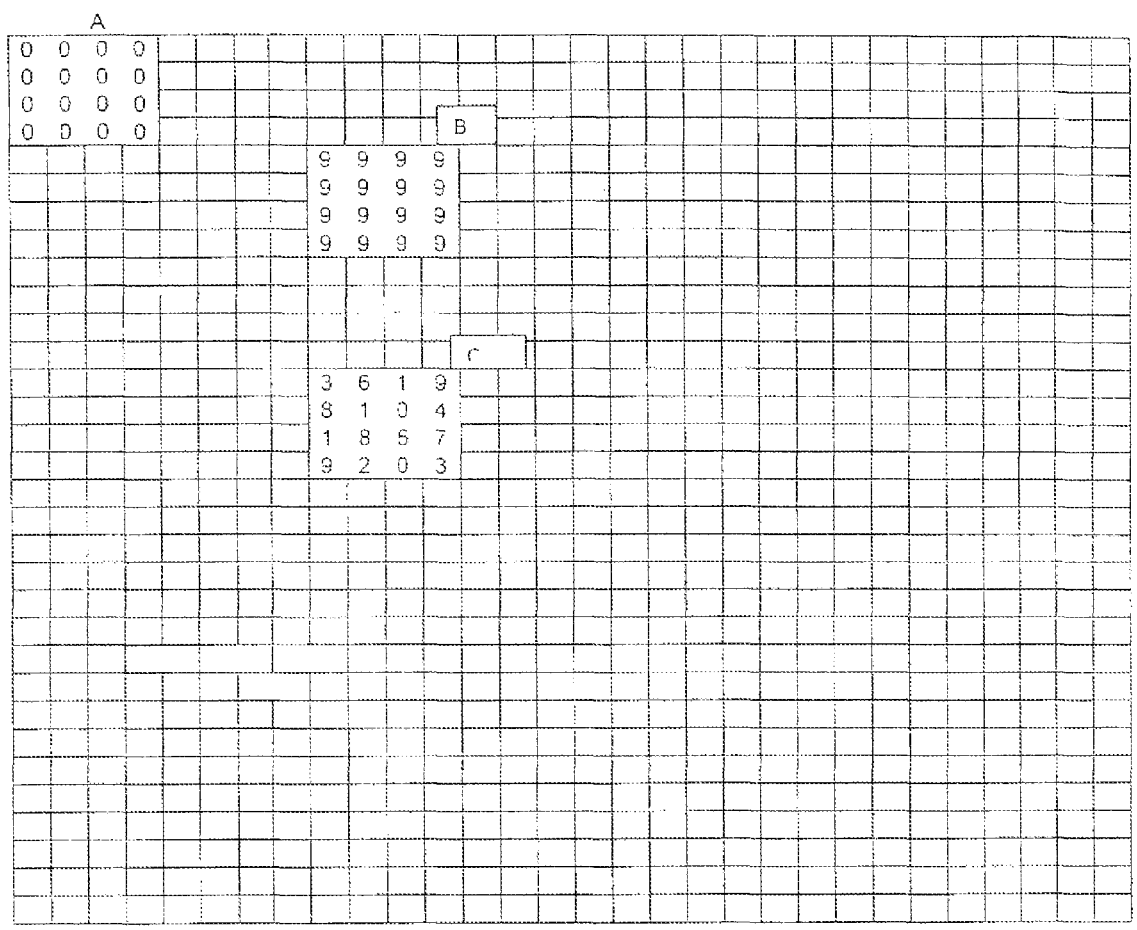
FIG. 3 illustrates the pixels in different regions of an image.

FIG. 3 illustrates pixels in an image. It should be noted that for convenience of illustration, only a limited number of pixels are shown in FIG. 3. The 4×4 blocks are shown for convenience of illustration. Of course the blocks can range in size from 4 to 500 pixels by 4 to 500 pixels, or more. Furthermore for convenience of illustration no attempt has been made to make the locations or size of the regions in FIG. 3 correspond to the regions in FIG. 1. In typical applications images are scanned at resolutions higher than 75 pixels per inch (resolutions of 300, 600 and 1200 pixels per inch are common) and the regions examined by watermarking programs would generally cover many more pixels than the regions shown in FIG. 3. However, the limited number of pixels shown in FIG. 3 is sufficient to explain the principles of the present invention.

In area A of FIG. 3 all of the pixels have a luminance value of zero. This area corresponds to an area such as area row c column 3 in FIG. 2 where the entire region is white. In area B all the pixels have a luminance value of 9. Area B corresponds to an area such as the area in row c column 7 in FIG. 2 where all of the pixels are black. In area C the luminance value per pixel varies between 0 and 9. Area C corresponds to an area such as the area in row g column 7 in FIG. 2 where the pixels have a range of luminance. Since the pixels in area A all have a luminance of 0, there is no possibility that this region contains watermark data. Likewise, since all the pixels in region B have a luminance value of 9, there is no possibility that region B contains watermark data. The pixels in region C have a variety of luminance values; hence, there is a possibility that this region does contain watermark data. The present invention is directed to detecting the area of an image where there is sufficient variance in the luminance of the pixels in the region that the region could contain watermark data. In one embodiment, an "edginess" factor (discussed below) can be used to select between regions that have the same or similar variance. In such a case, a region having a higher edginess factor is selected over a region with a lower edginess factor, when their variance is equal.

Figure 4:
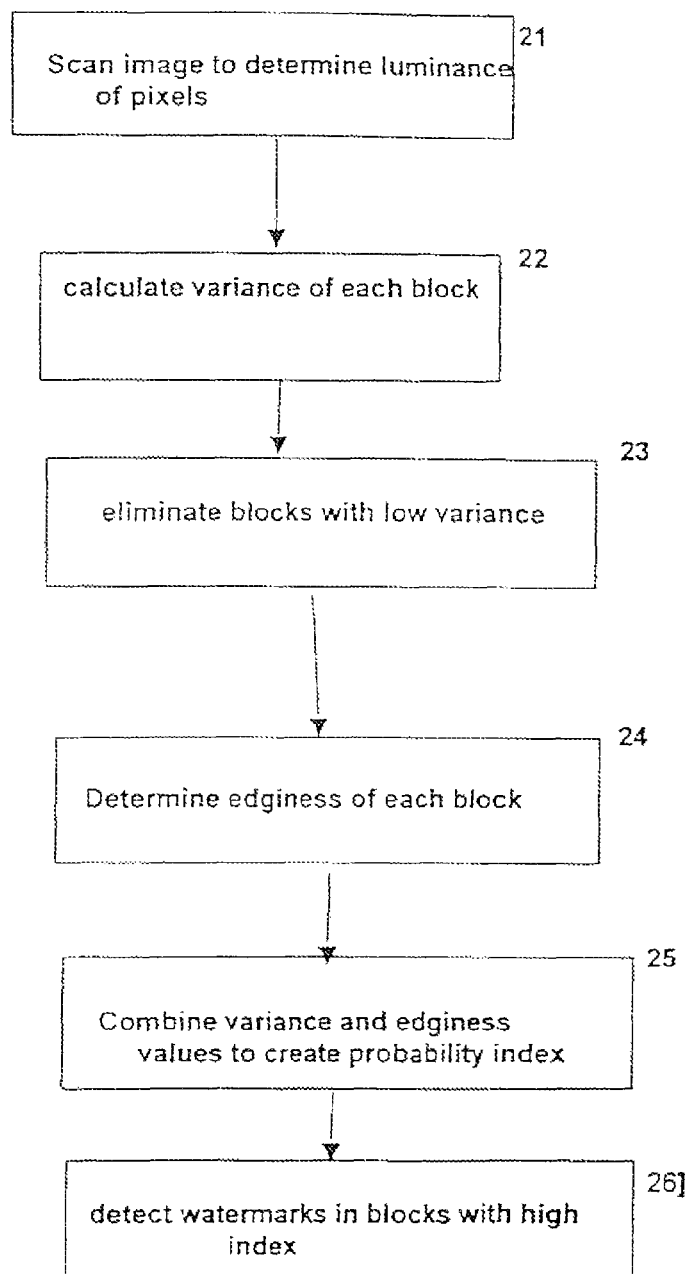
FIG. 4 shows a flow diagram for one embodiment of the present invention.

In one embodiment of the present invention the detection operation proceeds in accordance with the steps shown in FIG. 4. First as indicated by block 21 the image being examined is scanned to detect the luminance of the pixels in the image. Next the pixels are broken into regions. For example each region can be square and have in the order of 10000 to 40000 pixels (that is, in the order of 100 to 200 pixels square). The exact number of pixels in each region depends on the characteristics of the particular detection program used. There is, however, a general advantage of using smaller regions (e.g., 8×8 through 64×64) to calculate variance. Namely, a smaller region is less likely to be affected by image rotation. There is a tradeoff for selecting a smaller region, however, since the variance estimate is less statistically reliable due to the smaller number of pixel samples. As indicated by block 22, the variance in the luminance of the pixels in each block is calculated. The following formula is preferably used:

Variance=sum((intensity)$^2$/(number of pixels))−(mean intensity)$^2$

If the variance is less than a specified threshold the region is eliminated from further consideration. The threshold value selected will depend upon the size of the regions into which the detection program divides the image and upon the characteristics of the watermark as measured over a representative set of images. However, for a typical image with a program that divides the image into regions, which are in the range of about 100,000 to 300,000 pixels, the value can be in a range of 100 to 500. Of course the pixel range can be smaller if a lower resolution (e.g., 100 dpi) image (or image area) is evaluated.

An optimal minimum variance threshold is found to vary with resolution. That is, the higher the resolution, the higher the minimum variance should be. This is particularly the case when high-resolution data is efficiently down-sampled, e.g., without using antialiasing filters. Table 1 shows a relationship between optimal minimum variance thresholds and resolution. Of course, these minimum values may vary depending on image characteristics, scanner error, precision vs. efficiency requirements, etc. For instance, these minimum values may decrease depending on the above considerations.

TABLE 1

Minimum variance at different resolutions for optimal results

| | Resolution (dpi) | | | | |
| --- | --- | --- | --- | --- | --- |
| | 75 | 100 | 150 | 300 | 600 |
| Minimum variance | 50 | 66 | 100 | 200 | 300 |

Variance of pixels in a region tends to increase with resolution. This is particularly true at higher resolutions where nearest neighbor down sampled data (which may be highly aliased) is used to calculate variance. Increasing the variance threshold with resolution prevents selection of blocks with spurious variance caused by borders, paper texture, noise etc.

Figure 7:
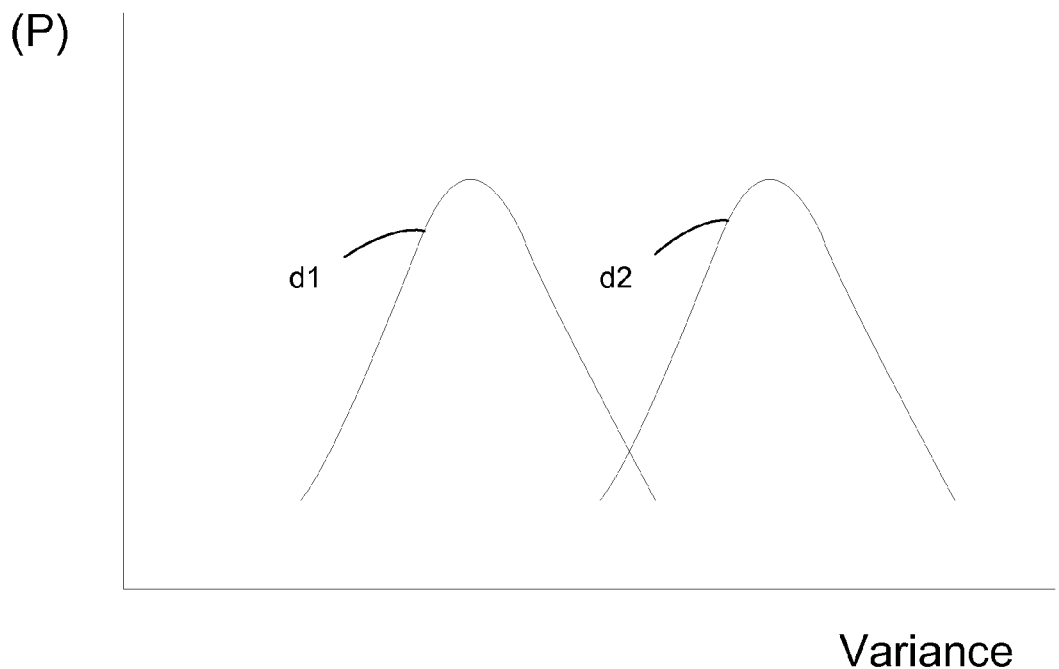
FIG. 7 is a graph showing a relative probability of a successful watermark detection for a given area having a particular variance.

Another variance determination method relies on a distribution formed by gathering a statistically significant amount of variance data across a broad range of images. Separate distributions d1 and d2 in FIG. 7 are computed for regions that have a high likelihood of successfully detecting a watermark and for regions that have a low likelihood of successfully detecting a watermark, respectively. A probability value associated with a variance for a detection block, e.g., a probability value indicating a likelihood of finding a watermark signal in a particular region having a given variance value, can then be determined for any given variance value. Thresholds can either be determined empirically, e.g., through Bayes' Rule or other hypothesis tests. This probability value is compared against a threshold or a set of thresholds to decide whether to keep the particular variance block. A look up table or software algorithm is preferably used to implement the distribution shown in FIG. 7. Note that the distributions shown in FIG. 7 are for illustrative purposes only. Indeed, the actual distribution could be different, e.g., multi-modal, non-Gaussian or a mixture of Gaussians. Also, the principles discussed with respect to FIG. 7 can be extended to other metrics as well (e.g., variance and edges) to form multivariate distributions.

To create the distributions shown in FIG. 7, where a probability of finding a watermark signal is graphed in relation to variance, a statistically significant number of variance values are determined from a respective number of sampled variance detection blocks. Each of the sampled variance detection blocks is read to determine whether it contains a watermark signal. This detection data is used to generate the probability distribution curves for given variances.

While there is a low probability that areas with a very low variation in luminance contain watermark data, there is also a low probability that certain areas, which have a very high variance in luminance, contain watermark data. For example, the area in row c column 6 contains the border between black area 11 and the remainder of the image. In areas such as the area at row c column 6, the variance in luminance would be high due to the edge effect; however, the high variance in luminance in an area such as row c column 6 would not indicate a high probability of finding watermark data. In a region such as row c column 6 the "edginess spread" is low. If a region has a low "edginess spread", the probability of finding watermark data is relatively low.

Thus, after the regions with high luminance variation values are found, those regions are tested to determine "edginess spread". That is, to locate regions where the variance is concentrated along a division between regions each of which have a low variance. Regions where variance in luminance is concentrated along a division between regions, each of which has a low variance in luminance, are said to have a low edginess spread.

In one embodiment, edginess is found by filtering the data with an edge operator such as a Laplacian operator or filter, which examines the pixels surrounding each pixel to calculate a New Pixel Intensity value (designated NPI value) and edginess spread value (ES) according to the following equations:

NPI=Abs Value(4×Intensity−(sum of intensities of pixels above,below,right and left)), where "Abs Value" means "take Absolute value of".

Calculate an NNPI value for each pixel as follows:

NNPI = 1 if NPI exceeds a T1; and
= 0 if NPI is less than or equal to T1.

ES=(Sum of NNPI for all pixels)/total number of pixels, where T1 is a "threshold" with a value selected to be near the average value of NPI.

The above calculation gives a second value (ES or edginess spread) for each region. The luminance variance value and the edginess-spread value are then combined to give a "probability index" which indicates the probability of finding a watermark in a particular region. Alternatively, a difference operator (e.g., a Sobel operator, etc.) could be used to account for both variance and edginess.

Figure 8:
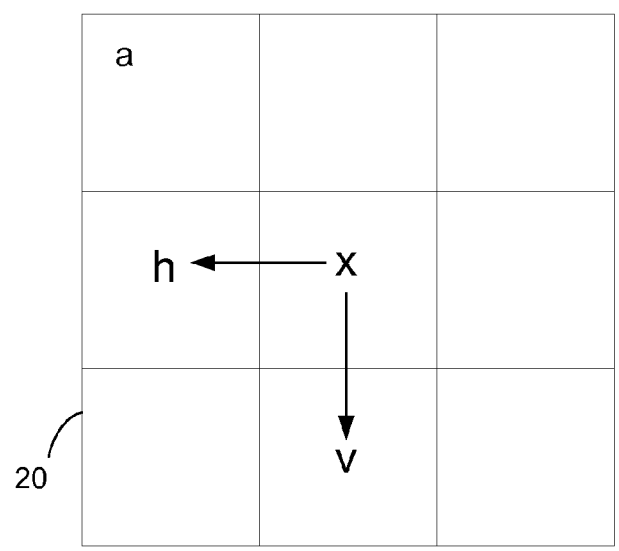
FIG. 8 shows an edginess detection method in relation to an image portion.

In another embodiment, edginess is determined by evaluating some of a pixel's (or area's) neighbors in comparison to that pixel. For example, a difference in graylevels (or color data) between neighboring pixels is compared to determine an edge or edginess value. With reference to FIG. 8, area x is compared to its horizontal (h) neighbor and vertical neighbor (v) to determine an edginess count. For a comparison with horizontal neighbor h, an edginess count is preferably incremented when:

x−h>$T_E$, where $T_E$ is an edginess threshold, and x and h are a measure of their respective pixel (or area) graylevel.

Similarly, for a comparison with vertical neighbor v, the edginess count is incremented when:

$x-v>T_E$, where v is also a measure of its respective pixel graylevel.

This process can be repeated for some or all of the areas within the edginess determination block 20. When area x is positioned at a boundary (e.g., pixel a) of block 20, the neighboring h pixel is preferably zero (0). Alternatively, a pixel value outside of block 20 that is located in the horizontal position h is used.

The total edginess count for block 20 can be compared against a predetermined number to determine whether to further use block 20 in the watermark detection process. Or the edginess count can be used to rank various edginess determination blocks. Of course this process can be modified without deviating from the scope of our invention. For example, instead of sampling a left horizontal neighbor, a right horizontal neighbor can be sampled. And instead of looking down to the vertical neighbor, a neighbor above can be sampled. In another case, a pixel x is compared to several horizontal neighbors and to several vertical neighbors, or even diagonal neighbors. Also, the illustrated edginess detection block 20 need not be limited to a 3×3 area as shown. Indeed, the block area can be increased (e.g., to an 8×8 through 64×64 area).

This process can be repeated for some or all blocks through out an image.

There are many factors to consider when determining an edginess threshold value. Since the edginess factor helps determine where the variance is coming from, a low edge count may indicate that the variance is confined to a small image region. In contrast, a large edge count may indicate that variance is distributed throughout an image region. A lenient threshold, e.g., 0-2 (or a difference of 0-2 graylevels between adjacent pixels to constitute an edge), will allow influence from random noise or from small image variations. A larger edginess threshold (e.g., 2-8) may include influence from a watermark signal. Increasing the edginess threshold may also reduce sensitivity to spurious edges caused by borders, paper texture, scanner backgrounds and noise. There is a tradeoff, however, since a larger threshold may miss a watermark signal embedded at a low strength. These same factors can be considered to determine an appropriate edginess count threshold.

In another embodiment, the edge threshold is resolution dependent, meaning the edge threshold changes are based on sample resolution. In still another embodiment, an edginess threshold is determined based on image characteristics. In this case, the edginess threshold adapts to the image (or scanner) characteristics. In yet another embodiment, the variance and/or edge threshold is adaptively determined by the size of the image or the available processing power/memory.

Another edginess method that is particularly useful to detect diagonal edges is now discussed. A horizontal map and a vertical map are determined based on pixel values in a edginess detection block. These maps are generated by determining those areas (or pixels) that have sufficient differences in graylevels when compared to neighboring pixels. The horizontal map is constructed using the horizontal techniques discussed above with respect to FIG. 8. High graylevel difference areas are designated as 1 (see FIG. 9a). A vertical map is constructed using the same vertical techniques as discussed above with respect to FIG. 8. High graylevel difference areas are designated as 1 (see FIG. 9b). The horizontal and vertical maps are then combined (e.g., with a Boolean "OR" operation or other combination technique) on a per pixel basis. The resulting map is used as the edge map (FIG. 9c). The edginess count of the new map (FIG. 9c) is counted to determine a total edginess count for the edginess detection area. The edginess counts obtained by this method are more robust with respect to distortions caused by operation such as image rotation.

The luminance variance value and the edginess-spread value can be combined in a number of ways to obtain a numeric probability index that a region can contain watermark data. For example the values can be combined as follows:

Probability index=((variance value)/100)+10(edginess value)

Table 2 is an example of a probability index, which results from a number of different values of luminance variation, and a number of values of edginess spread.

TABLE 2

| Probability Index | | |
|---|---|---|
| Variance value | Edginess value | Probability Index |
| 300 | 7 | 10 |
| 500 | 2 | 7 |
| 700 | 9 | 16 |

In the above example, the region with the probability index of 16 would be examined first, followed by the region with an index of 10. Regions with an index value of less than 10 would only be examined if the other regions that are examined do not result in the detection of watermark data of sufficient reliability.

It is noted that the equation for combining the values of luminance variation and edginess to obtain the probability index for a region was determined empirically. The equation given above does not take into account the magnitude of the change in luminance across an edge. The following equation for calculating edginess spread takes into account the magnitude of the change in luminance across an edge.

$ES$=(Sum of $NPI$ for all pixels that exceed $T1$/total number of pixels).

By testing the success obtained with different groups of images of interest which have different characteristics one can determine which equation gives the best results for images with a particular set of characteristics.

In other embodiments, we do not combine the edginess and variance factors in the manner discussed above. Instead, detection blocks are selected if they meet both the threshold edginess and/or variance factors. Or variance and edginess may be used together or separately and/or in combination with the other probability factors discussed herein.

It is noted that U.S. patent application Ser. No. 09/074,034 filed May 6, 1998 (U.S. Pat. No. 6,449,377) describes a technique for inserting watermarks into a lined image by varying the width of the lines to indicate watermark data. The present invention would still produce satisfactory results with watermarks of the type described in the above referenced application. The reason is that the line widths in a typical image, which uses the technique described in the above application, have a width significantly smaller than the size of a pixel in an image from a typical 300 or 600 DPI scanner. The edginess measurement detected by the present invention relates to edges between regions, each of which are wider than a single pixel.

Figure 5:
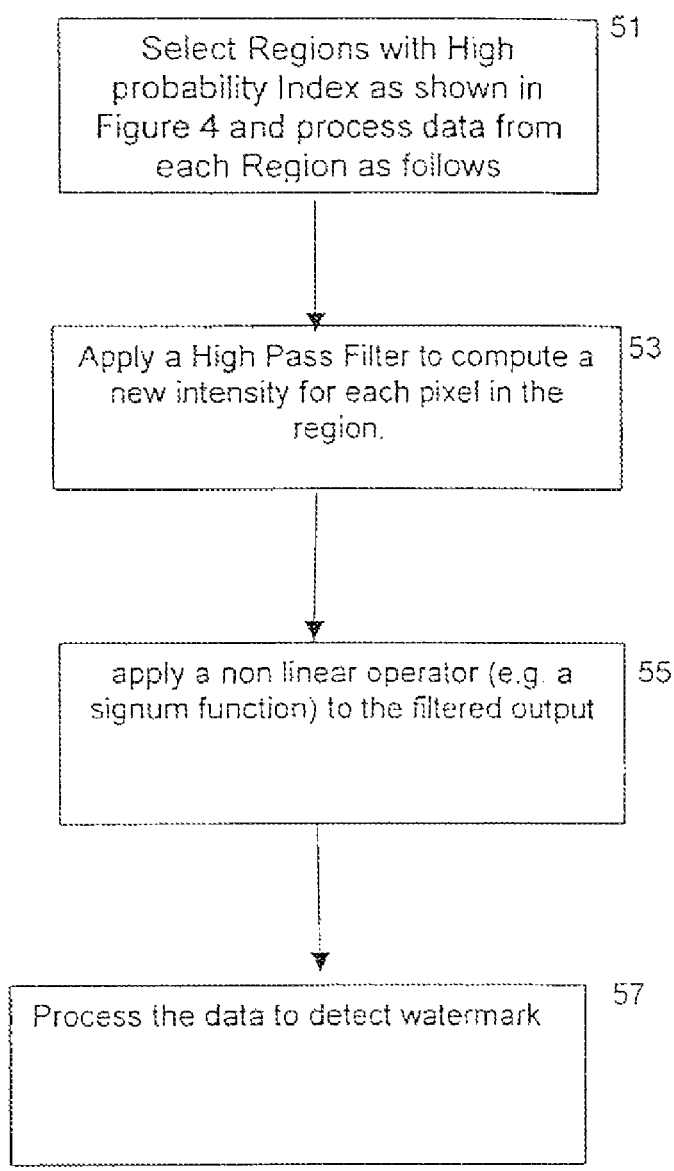
FIG. 5 shows a flow diagram for additional steps that can be used.

The present invention can optionally utilize additional filtering to enhance the possibility of finding watermark data in the regions selected for further processing by the above-described technique. A flow diagram showing how the additional filtering is performed is shown in FIG. 5. The additional steps shown in FIG. 5 facilitate the detection of watermark data in those regions selected for further processing by the steps shown in FIG. 4.

In the process shown in FIG. 5, regions that have a high probability of carrying watermark data are selected for further processing as described above. However with the steps shown in FIG. 5, the regions selected for further processing are filtered prior to the detection step in order to enhance the detection process. The filtering enhances the probability that watermark data (if present) will be detected when a region is later processed in a normal or conventional manner to find a watermark. The filtering is done in two steps. First as indicated by block 52, a high pass filter (e.g. a Laplacian operator) is applied to the data. Next as indicated by block 55 a non-linear operator (e.g. signum function) is applied to the filtered data. Finally the data is processed in a conventional manner to detect the watermark data.

The first step passes the data from a region through a filter with high pass or edge detection characteristics. For example a Laplacian (or Sobel or Roberts, etc) operator can be applied to each block that was selected for further processing. In the specific embodiment shown here, the high pass filter computes a new intensity value at each pixel in the block as follows:

$$\text{Filtered intensity} = (\text{Old intensity}) - (\text{average intensity of the 8 neighbors of the pixel})$$

The second step applies a nonlinear operator (e.g., a signum operator etc) to the filtered output of the high pass or edge detection filter. The filtered intensity (FI) of each pixel calculated as given above is modified as follows:

$$\text{New Intensity} = a \text{ if } (FI > T1);$$
$$= b \text{ if } (T2 <= FI <= T1); \text{ and}$$
$$= c \text{ if } (FI < T2),$$

where: a, b, and c are values, and T1 and T2 are thresholds selected to implement a specific nonlinear operator.

In the specific embodiment shown herein a signum function is used to calculate a new intensity for each pixel according to the following equation:

$$\text{New Intensity} = 1 \text{ if (Filtered intensity} > 0)$$
$$= 0 \text{ if (Filtered intensity} = 0)$$
$$= -1 \text{ if (Filtered intensity} < 0)$$

The high pass filter attenuates the low frequencies and amplifies the contribution from the higher frequencies in each block. The contribution to the low frequencies is mostly from the host image content. Higher frequencies from the watermark signal are amplified. The nonlinear operation in effect whitens the noise caused by the host image content in the frequency domain, increasing the signal-to-noise ratio of the watermark signal.

It is noted as described above, a two-dimensional high pass filter is first applied to the data and then the non-linear operator is applied to the result. With many types of images better detection can be achieved by applying a one dimensional high pass filter in the horizontal direction, applying the non linear operator to that result, applying a one dimensional high pass filter in the vertical direction, applying the non linear operator to that result, and then summing the two partial results. With other types of images better results can be achieved by applying the one-dimensional high pass filters in various other directions.

Since some watermarking programs redundantly embed watermark data in multiple blocks in an image, in order to further enhance the ability to detect the watermark data from such programs the following technique can be used. Following the non-linear filtering operation, the power spectrum of several blocks can be added together. Due to the redundant embedding, the watermark frequencies repeat through several blocks, the power at those frequencies adds up if the power spectrum of several blocks is added together. The image frequencies from block to block are generally non-repetitive and hence they get averaged out when the power spectrum of several blocks are added together. The power spectrum that results from adding together the power spectrum from several blocks contains a higher signal-to-noise ratio watermark signal. The power spectrum can then be more easily correlated with the power spectrum of the watermark.

Figure 6:
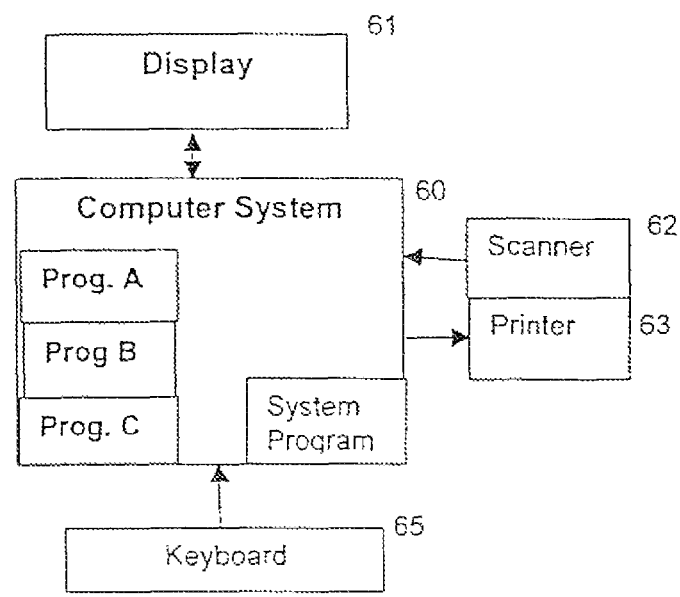
FIG. 6 shows a system diagram for practicing an embodiment of the present invention.

A system for practicing one embodiment of the present invention is shown in FIG. 6. The system includes a conventional computer 60 with an associated display 61, an associated document scanner 62 and an associated printer 63. The computer 60, display 61, scanner 62 and printer 63 are conventional components of personal computer systems such as those marketed by vendors such Compact Computer Company, Dell Computer Company, Gateway Computer Corp. etc.

One embodiment of the present invention is practiced under control of programs A, B and C, which are stored in computer 60. Program A is a conventional watermark detection program. Program A processes regions of an image to locate watermark data after program B selects the regions of the image which should be processed and program C filters the data from such regions.

Programs which process the pixels in an image to locate watermark data are included in such commercially available programs as the program entitled "Photoshop" which is marketed by Adobe Corporation or the program "Corell DRAW" which is marketed by Corel Corporation, or the program "Micrografx Picture Publisher" which is marketed by Micrografx Corporation. Such programs divide an image into regions and process each region in order to detect the presence of watermark data. With the present invention the same mechanism is used to process the data from each region of an image; however, all the regions of an image are not processed in order.

Program B selects regions of an image, which have a high probability of containing watermark data by first selecting regions that have a high variation in luminance, and a high amount of edginess spread as previously described. Program C filters the regions selected for further processing using the two steps process previously described.

In the embodiment of the invention described above, program 51 (shown in FIG. 5) which selects blocks for further processing merely indicates to the subsequent filtering program which blocks should be processed further. The block selection program could be used to acquire other information about the various blocks in the image. Such additional information could be passed to the filtering programs shown in block 53 and 55 and to the watermark detection program indicated by block 57 to quickly tune these programs to the characteristics of the image in particular regions.

The present invention includes a wide range of additional probability factors. A probability factor can be viewed as a selection criteria or rule that is used to identify those regions in an image which have a high likelihood of including a watermark signal. These image regions generally include image characteristics that are conducive to (or indicative of) hiding or carrying a watermark signal. Or these image regions may be located in a particular advantageous area, or may include significant signal strength. Probability factors are used to select a plurality of detection blocks, which are image regions identified as having a relatively high probability of including a watermark signal. Variance and edginess are just a few of our inventive probability factors. There are many more.

Figure 10A:
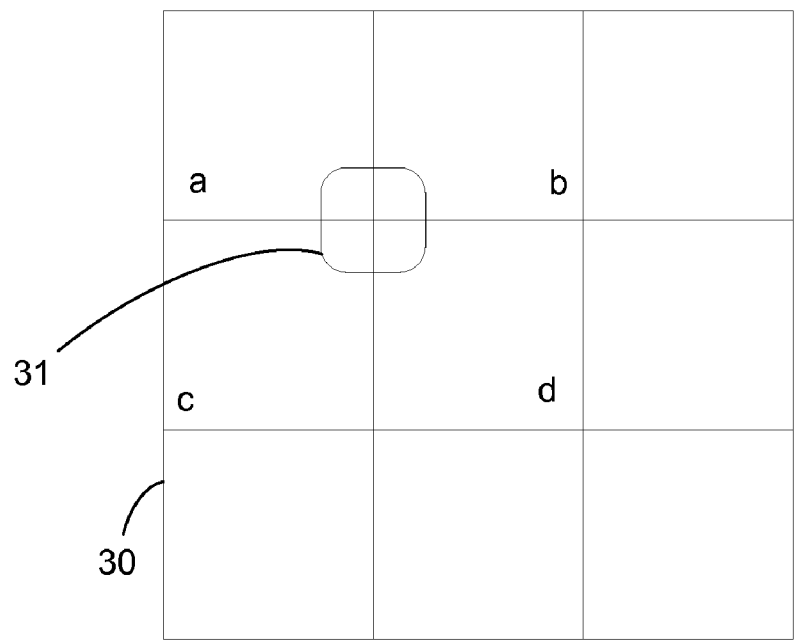
FIGS. 10a-10c show an image portion that is divided by regions for processing.
Figure 10B:
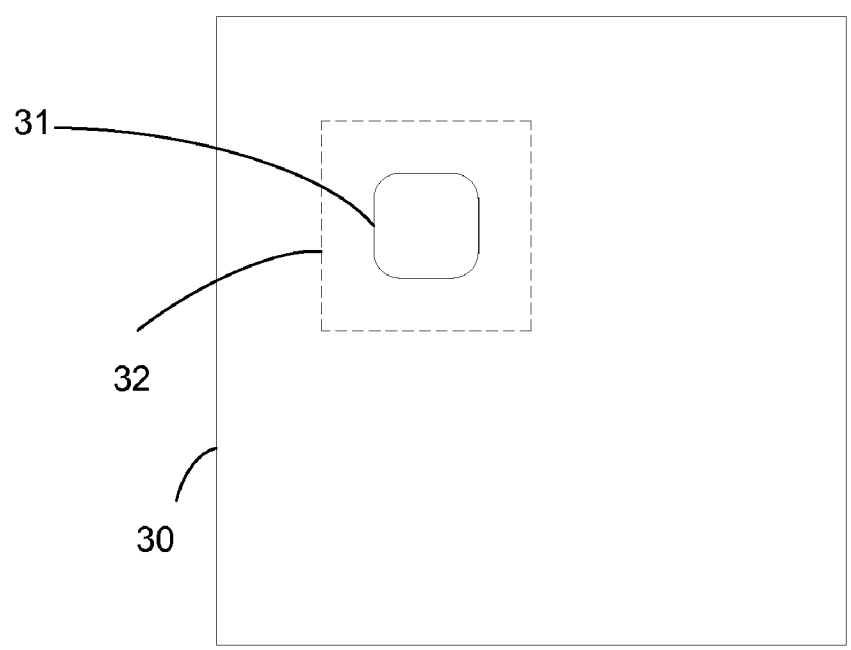

Consider an embodiment in which detection blocks (or areas) float, instead of being sequentially arranged as in FIG. 2. Allowing detection blocks to float to various image regions and, optionally, to overlap with other detection blocks, allows for improved detection of off-centered watermarks. Moreover centering a detection block on an image region, which includes characteristics that may indicate a region of high detection probability, can help to reduce watermark signal estimation error—such as rotation and scale error—particularly if a captured region is approximately centered in a floating detection block. A floating detection block is illustrated with reference to an image (or image portion) 30 shown in FIGS. 10a and 10b. In FIG. 10a image 30 is sequentially segmented into detection regions (e.g., a, b, c and d). For this example region 31 is assumed to include characteristics indicating a high probability of containing a watermark signal. Region 31 is off centered with respect to the sequential detection blocks a, b, c and d shown in FIG. 10a. Accordingly, a watermark detector may not successfully detect the presence of a watermark signal. Detection chances are improved if a detection block 32 (FIG. 10b) is allowed to float in order to enclose a larger portion of region 31. Centering floating detection block 32 on region 31 allows for a higher probability of detection and lowers watermark signal rotation estimation error. Although FIG. 10b encloses the entire region 31, it may not always be possible to do so, depending on a floating detection block size.

Figure 10C:
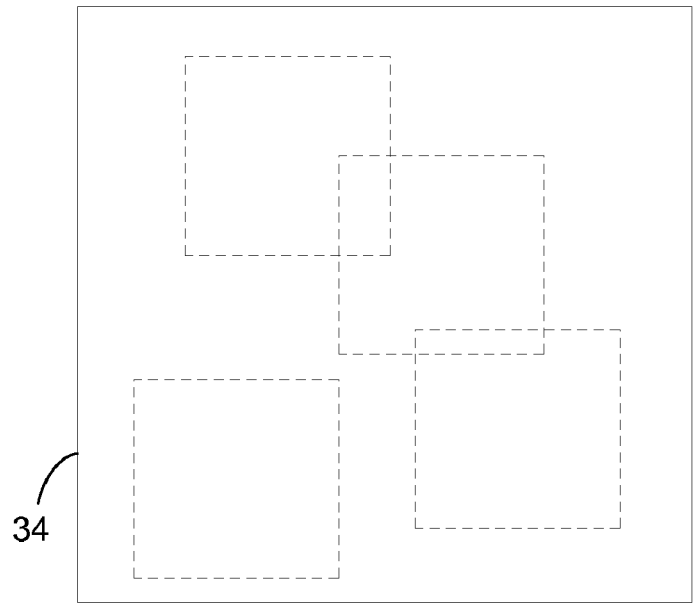

FIG. 10c shows a plurality of floating detection blocks, illustrated by dashed lines, which are arranged over an image or image portion 34. Preferably, a floating detection block is positioned in a region that has high probability characteristics, e.g., such as having adequate variance and edginess or based on other probability factors discussed herein. A floating block can be centered on or otherwise positioned around such a high probability region. In one embodiment, a detection block covers a larger region of the image than does the respective blocks used to determine variance and edginess. A variance block size may also be larger than an edginess block size, or vice versa.

In order to increase the effectiveness of a plurality of floating detection blocks, additional probability factors can be used to arrange or position the blocks over an image. Since these probability factors often involve a compromise between processing efficiency and memory considerations, a fixed number of detection blocks can be selected in some embodiments. The fixed number of detection blocks can be divided into subsets. For example, a first subset of detections blocks can be processed according to probability factors that maximize the detection of a digital watermark synchronization or orientation signal. Or the first subset can be selected to identify the rotation and/or scale of a watermark signal. Or the first subset can be selected based solely on processing speed requirements. A second subset of detection blocks can be processed using different criteria, e.g., to maximize detection of a message payload or signal translation, or to balance memory constraints.

Several competing factors are preferably balanced to achieve an optimal number of members for each detection subset. First is a consideration that a watermark signal may be embedded in the image with a low signal-to-noise ratio (SNR). A low SNR is sometimes used with digital watermarks to minimize visibility of an embedded watermark signal. Second is a consideration of detection time constraints that are often placed to establish a maximum time to determine whether an image includes a watermark signal. This constraint suggests that a fewer number of blocks should be examined. In contrast, there is often a need to accurately detect the watermark signal, which suggests that more blocks should be examined. If time and memory limitations were not a concern, this later approach would almost certainly be preferable. Yet a watermark system designer is faced with real world constraints. Accordingly, a watermark detection system preferably balances such considerations when determining an optimal number of detection blocks, and whether to allocate such detection blocks into a first and second subsets. For an 8½×11 inch, 100 dpi image that is segmented into 128×128 blocks, the number of detection blocks preferably falls within a range of 12-48 blocks. More preferably, the number of detection blocks falls within a range of 26-36 blocks. These blocks can be allocated into a first and second subset as mentioned above to balance various system requirements. Of course, these ranges many vary depending on block size, resolution, image size, and image characteristics.

In one embodiment, a first subset of detection blocks is used to determine whether a watermark signal is even embedded within the image, e.g., through the detection of a watermark component such as an orientation or synchronization signal. The presence of a watermark component announces the presence of a watermark within the image with a high certainty. If no watermark component signal is found during the examination of the first subset, the image is preferably deemed unmarked and is likely rejected. As a result it is important that the first subset of detection blocks collectively contain enough watermark signal to be able to detect a watermark component signal, if present. In many watermark designs, the coverage or placement of a watermark within an image is small. Visibility requirements may force the digital watermark to be embedded in regions with diverse characteristics. Accordingly, we have found that it is advantageous to increase the block coverage (e.g., decrease detection block overlap for floating blocks) for the first subset of blocks in order to increase the chance of locating a watermark component.

Figure 11:
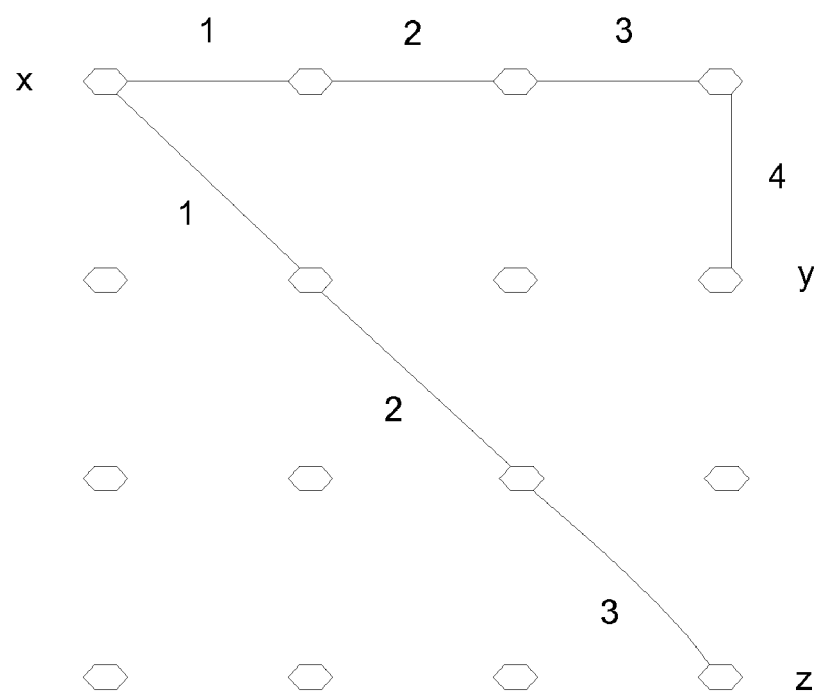
FIG. 11 shows city-block and diagonal distances between centers of detection blocks.

In particular, we established a proximity metric (one of our probability factors) to help ensure broad coverage for the first subset of detection blocks. A minimum "city-block" distance between centers of selected detection blocks is set, and is preferably in a range of 2-8 city-block centers. (The centers of detection blocks x and y, along with additional blocks, are represented by hexagon-shaped dots in FIG. 11. The city block distance between blocks x and y is 4). Additional criteria can be set to further ensure broad detection block coverage in the first subset. For example, a minimum diagonal distance between block centers can be established. Preferably, the minimum diagonal distance is in a range of 2-6 blocks. (The diagonal distance between blocks x and z is 3 as shown in FIG. 11).

A second set of proximity metrics can be used to regulate overlap for the second subset of detection blocks. In some embodiments it is advantageous to increase block overlap in the second subset to help focus watermark detection efforts on high probability image areas. Accordingly, the city block distance and diagonal requirements can be decreased. For the second subset, the minimum city-block distance between centers of selected blocks is preferably in a range of 1-4 block centers, and the minimum diagonal distance is in a range of 1-3 block centers.

Of course, for both the first and second subsets, the city block distances and diagonal requirements can vary depending on resolution, image characteristics, scanner error and characteristics, performance vs. efficiency compromises, memory requirements, etc. Also, instead of being measured from the center of a block, such distances can be measured from an edge, corner, off-center location, etc.

In some embodiments, a detection block is segmented into subblocks, and the proximity metrics discussed above can be imposed on the segmented subblocks.

In one embodiment, detection blocks in the first subset are weighted according to their probability of including those characteristics likely to support (or hide) a watermark signal. Higher probability blocks are more heavily weighted. Blocks with a lower weighting are dropped (or conferred to secondarily) when determining the presence of a watermark signal. For example, consider a first subset that contains 10 detection blocks. Blocks 1-7 may collectively represent 90% of the weighting, leaving a collective 10% weight for blocks 8-10. Blocks 1-7 are used as the primary detection blocks in the first subset, while blocks 8-10 are discarded or held in reserve. Blocks 1-7 are then analyzed to detect a watermark signal. This same type of weighting can be applied to the second subset for detection of a watermark signal. In one embodiment, the weighting is determined by estimating the signal-to-noise ratio in each block. This estimate is used to rank (or weight) the blocks.

Requiring a minimum variance separation between selected detection blocks can be used to improve detection block selection. This probability factor forces some or all of the selected detection blocks to differ in variance from other selected detection blocks. Requiring a minimum variance separation can be a significant factor since when a large number of selected blocks have the same or similar variance, it often indicates that the selected blocks are either from the image's background or are focused in small regions of the image. A minimum variance separation has the effect of spreading out the blocks—lessening the effect of background or small region influence. Of course, a threshold can be selected to maximize the effect of such a minimum separation requirement. And, as discussed above, the variance separation threshold may be selected to vary according to image characteristics or resolution—creating an adaptive threshold value.

Figures 12, 13:
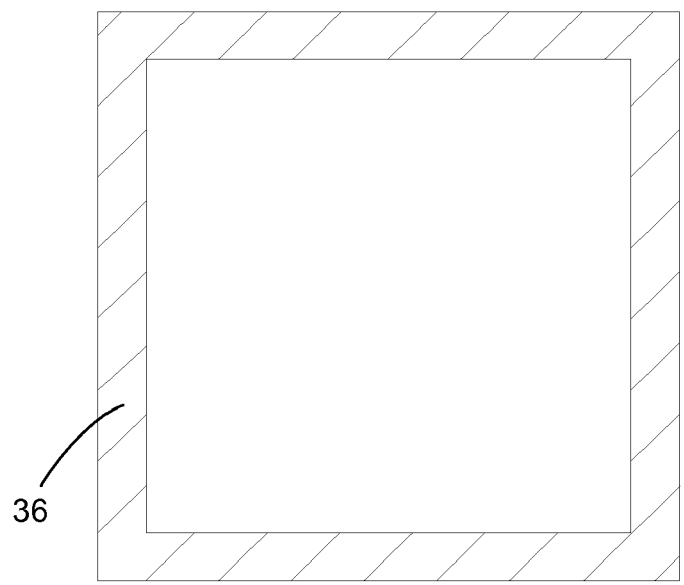
FIG. 12 shows a keep away zone near a border of an image.
FIG. 13 shows a neighborhood of detection blocks.

Another probability factor establishes a "keep away" zone 36 near the borders of an image. (See FIG. 12, in which the hashed area indicates the keep away zone 36). Detection blocks preferably are not selected if centered within this keep away zone 36. The result is to slightly pull the block centers away from the scan borders. The motivation for this improvement is to reduce the sensitivity of edges caused by borders, scanner error, image misalignment and/or noise. Experimentally, we have found that a significant benefit is seldom received from blocks that are centered at an image border. Preferably, the keep away zone is in a range of 1-4 city block centers from the image border. Of course this distance can be expanded according to specific implementations and to image, scanner and/or border characteristics.

Yet another probability factor is our "good neighbor" rule, which is particularly beneficial for images at higher resolutions. The good neighbor rule ensures that neighboring regions also have good variance/edge characteristics so that detection block selection can be focused on regions that have a higher likelihood of containing a watermark signal. The good neighbor rule helps to prevent selection of isolated regions that have good variance/edge characteristics. The reasoning is that a watermark is not usually found in isolated regions. And even if a watermark is found, such an isolated region may not necessarily contribute towards successful watermark detection.

The good neighbor rule provides that detection blocks neighboring a selected detection block meet established minimum variance and/or edge count requirements. Consider FIG. 13, which illustrates a detection block neighborhood including blocks 1-9. If block 5 is preliminary selected as a detection block, then a threshold number of neighboring blocks (blocks 1-4 and 6-9) should meet the variance and/or edge count requirements. These threshold values can be determined based on precision vs. efficiency requirements of a detection application. Moreover, isolated regions can be better filtered out when the threshold value is increased (e.g., all or a majority of neighbors meet the thresholds). Preferably, between 4-8 neighbors must meet each of these edge and variance requirements before a central neighbor block is selected. Of course, this range can be varied according to precision required.

In some embodiments, an image is segmented into subblocks, which are smaller than the detection blocks. The good neighbor rule can be applied to these smaller blocks to help better filter out isolated regions of high variance and edginess.

Another probability factor helps to ensure that if a sufficient number of detection blocks have not been found, the variance thresholds (and optionally the proximity metrics discussed above) are reset to lower values and the search for acceptable blocks is repeated. Resetting the thresholds is particularly advantageous when an image is small (in which case, the city-block distance requirements discussed above may prevent further blocks from being selected) or when the image contrast has been reduced.

Still another probability factor relies on color saturation in a detection block. The color saturation level for a block is determined and then compared with a predetermined threshold level. If the saturation level is above the threshold, the block is selected or ranked. The higher the color saturation level, the higher ranking the block receives. In one embodiment, the saturation value is weighted (or combined) with other probability factors, e.g., edginess and variance. The collective metric is used to select a detection block.

Figure 14:
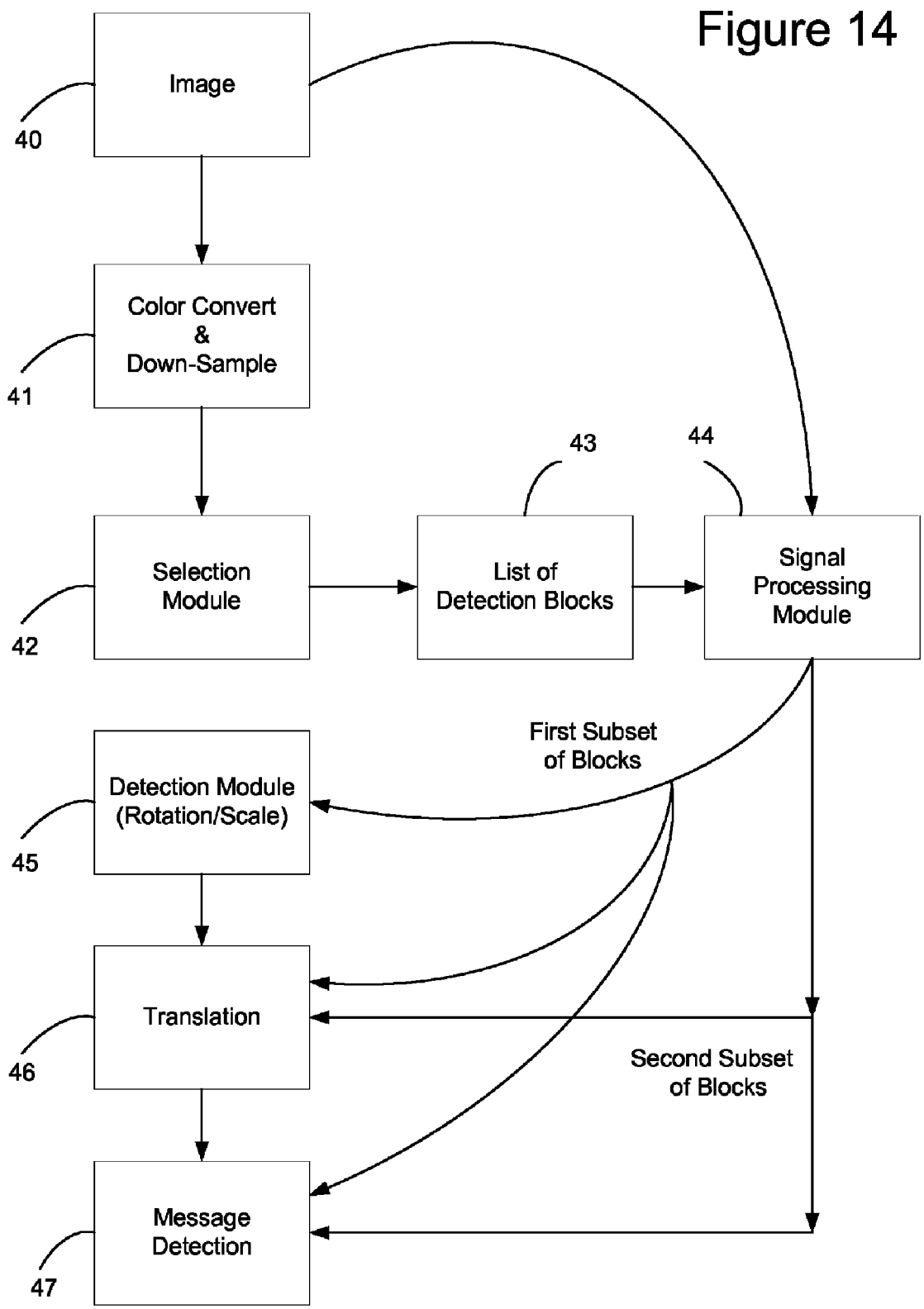
FIG. 14 illustrates a system diagram for practicing an embodiment of the present invention.

With reference to FIG. 14, a selection module 42 implementing some or all of the above described probability factors is described in relation to an embodiment of a watermarking detection system. An image 40 is presented for watermark detection. Image 40 is preferably color converted and downsampled in module 41. The color-converted image is then presented to selection module 42. Selection module 42 selects a plurality of detection blocks, which have a relatively high probability of including a watermark signal embedded therein, according to some or all of the probability factors discussed herein. The selection module 42 generates a list of selected detection blocks 43. The selected detection blocks 43 are processed, e.g., color converted, anti-aliased, and downsampled, in processing module 44. Detection module 45 searches a first subset of the selected (and processed) detection blocks for a watermark component (e.g., an orientation signal) and/or to determine rotation, scale, differential scale, and/or shear from a detected watermark component. These detection results can be passed to the translation module 46.

Translation and message detection are carried out in modules 46 and 47, respectively, from a second subset (and optionally the first subset) of the selected (and processed) detection blocks, preferably only when detection module 45 detects a watermark component in the first subset. The first subset of blocks can be optionally passed to translation and message detection modules 46 and 47.

CONCLUSION

The foregoing are just exemplary implementations of the present invention. It will be recognized that there are a great number of variations on these basic themes. The foregoing illustrates but a few applications of the detailed technology. There are many others.

It is noted that while the previously described embodiments discuss application of the present invention to images, the present invention is not so limited. Instead, the present invention can likewise be applied to other types of media such as video and audio.

While many probability factors have been disclosed above, it should be appreciated that not all of these factors need to be employed in a single embodiment. Instead, a selection process may only include one, several or all of the above noted factors.

It should be appreciated that the various image blocks shown in the drawings are for illustrative purposes only. The block and image sizes can be varied without deviating from the scope of the present invention.

As an alternative embodiment, all of the first and second detection block subsets mentioned use the same probability factors, rather than using different factors.

To provide a comprehensive disclosure without unduly lengthening this specification, the above-mentioned patents and patent applications are hereby incorporated by reference. The particular combinations of elements and features in the above-detailed embodiments are exemplary only; the interchanging and substitution of these teachings with other teachings in this application and the incorporated-by-reference patents/applications are expressly contemplated.

The above-described methods, systems and functionality can be facilitated with computer executable software stored on computer readable media, such as electronic memory circuits, RAM, ROM, magnetic media, optical media, memory sticks, hard disks, removable media, etc., etc. Such software may be stored and executed on a general-purpose computer, or on a server for distributed use. Data structures representing the various luminance values, variance metrics, edginess factors, probability factors or methods, image signals, watermark signals, etc., may also be stored on such computer readable media. Also, instead of software, a hardware implementation, or a software-hardware implementation can be used.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method comprising:
   obtaining a media signal comprising a steganographic signal hidden therein;
   selecting, using a processor, portions of the media signal for steganographic signal detection, wherein the portions of the media signal are selected based on at least one or more predetermined probability factors, wherein a probability factor comprises a selection criteria or rule to identify portions of the media signal which have a higher likelihood of including a steganographic signal relative to other portions of the media signal; and
   analyzing, using the processor, selected portions of the media signal to obtain the steganographic signal.

2. The method of claim 1, wherein the media signal comprises imagery, video, or audio.

3. The method of claim 1, wherein at least one probability factor utilizes a host media signal information, wherein the host medical signal information is independent of the steganographic signal.

4. The method of claim 1, further comprising inhibiting use of the media signal based on the steganographic signal.

5. The method of claim 1, wherein the method is carried out in real time as the media signal is received.

6. The method of claim 1, wherein selecting portions of the media signal utilizes selection criteria based at least in part on detecting portions of the media signal with a floating segmentation of the signal.

7. The method of claim 1, wherein the probability factors are independent of the steganographic signal.

8. A computer readable medium having instructions stored thereon, the instructions comprising:
   instructions to obtain a media signal comprising a steganographic signal hidden therein;
   instructions to select portions of the media signal for steganographic signal detection, wherein the portions of the media signal are selected based on at least one or more predetermined probability factors, wherein a probability factor comprises a selection criteria or rule to identify portions of the media signal which have a higher likelihood of including a steganographic signal relative to other portions of the media signal; and
   instructions to analyze selected portions of the media signal to obtain the steganographic signal.

9. The computer-readable medium of claim 8, wherein the probability factors are independent of the steganographic signal.

10. The computer-readable medium of claim 8 wherein the media signal comprises imagery, video, or audio.

11. The computer-readable medium of claim 8, wherein at least one probability factor utilizes host media signal information, wherein the host media signal information is independent of the steganographic signal.

12. The computer-readable medium of claim 8, further comprising instructions to inhibit use of the media signal based on the steganographic signal.

13. The computer-readable medium of claim 8, wherein the instructions to select portions of the media signal utilize selection criteria based at least in part on detecting portions of the media signal with a floating segmentation of the signal.

14. An apparatus comprising:
   a memory configured to store a media signal, wherein the media signal comprises a steganographic signal hidden therein; and
   a processor configured to:
      select portions of the media signal for steganographic signal detection, wherein the portions of the media signal are selected based on at least one or more predetermined probability factors, wherein a probability factor comprises a selection criteria or rule to identify portions of the media signal which have a higher likelihood of including a steganographic signal relative to other portions of the media signal; and analyze the selected portions of the media signal to obtain the steganographic signal.

15. The apparatus of claim 14, wherein the media signal comprises imagery or video.

16. The apparatus of claim 14, wherein the media signal comprises audio.

17. The apparatus of claim 14, wherein the processor is further configured to inhibit use of the media signal based on the steganographic signal.

18. The apparatus of claim 14, wherein the processor is configured to select portions of the media signal utilizing selection criteria based at least in part on detecting portions of the media signal with a floating segmentation of the signal.

19. The apparatus of claim 14, wherein the probability factors are independent of the steganographic signal.

20. The apparatus of claim 14, wherein a probability factor utilizes host media signal information, wherein the host media signal information is independent of the steganographic signal.

* * * * *

UNITED STATES PATENT AND TRADEMARK OFFICE
CERTIFICATE OF CORRECTION

PATENT NO.         : 7,978,875 B2                                                Page 1 of 1
APPLICATION NO.    : 12/539093
DATED              : July 12, 2011
INVENTOR(S)        : Sharma et al.

It is certified that error appears in the above-identified patent and that said Letters Patent is hereby corrected as shown below:

Column 16, line 13, in Claim 3, delete "medical" and insert -- media --.

Column 16, line 25, in Claim 8, delete "computer readable" and insert -- computer-readable --.

Column 16, line 42, in Claim 10, delete "claim 8" and insert -- claim 8, --.

Signed and Sealed this
Twenty-seventh Day of December, 2011

David J. Kappos
*Director of the United States Patent and Trademark Office*